June 16, 1964
G. RICHWELL
3,137,821
DISCRIMINATORS
Filed March 14, 1960
3 Sheets-Sheet 1
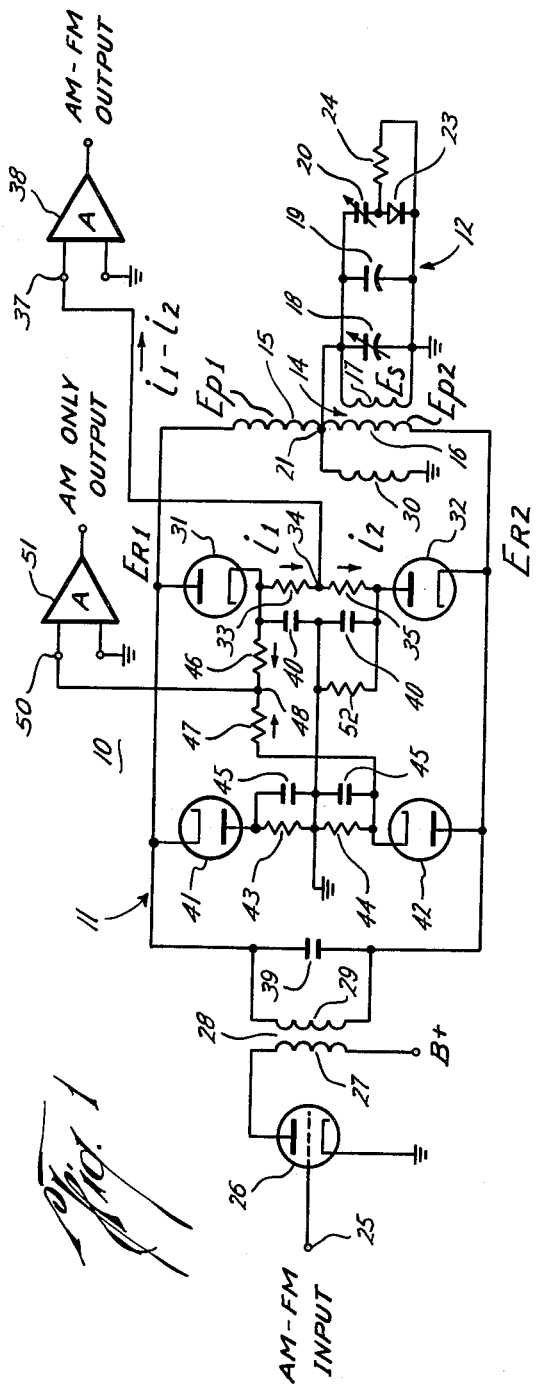
Fig. 1
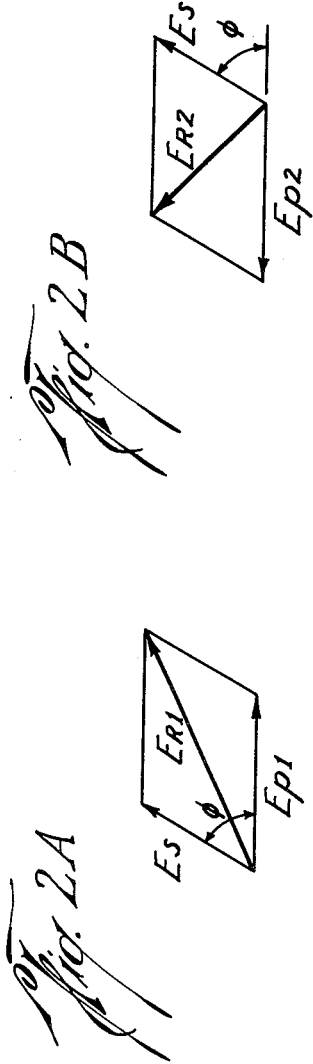
Fig. 2B
Fig. 2A
Gunnar Richwell
INVENTOR.
BY William R. Sherman
ATTORNEY

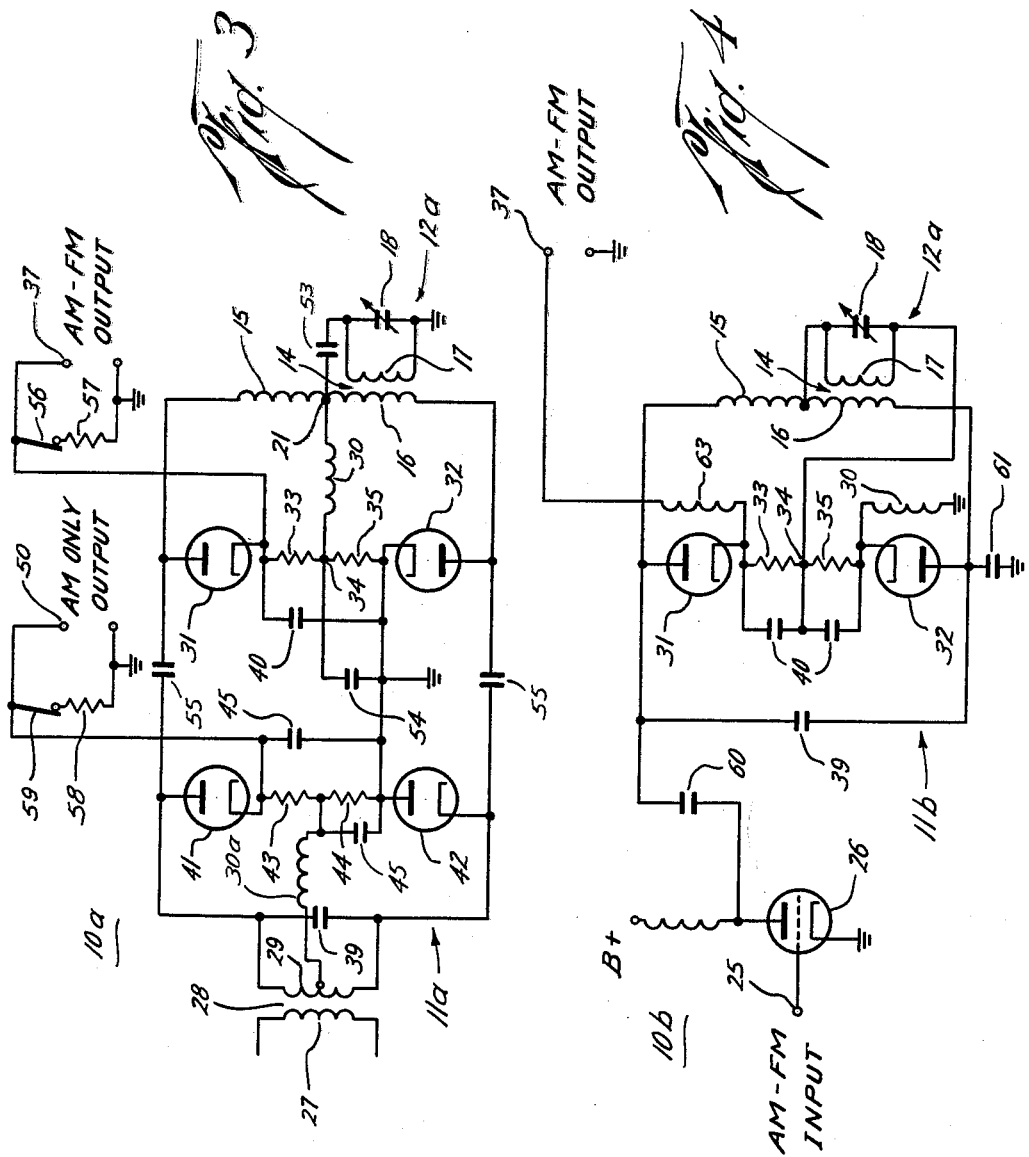

June 16, 1964          G. RICHWELL          3,137,821
DISCRIMINATORS
Filed March 14, 1960                              3 Sheets-Sheet 3
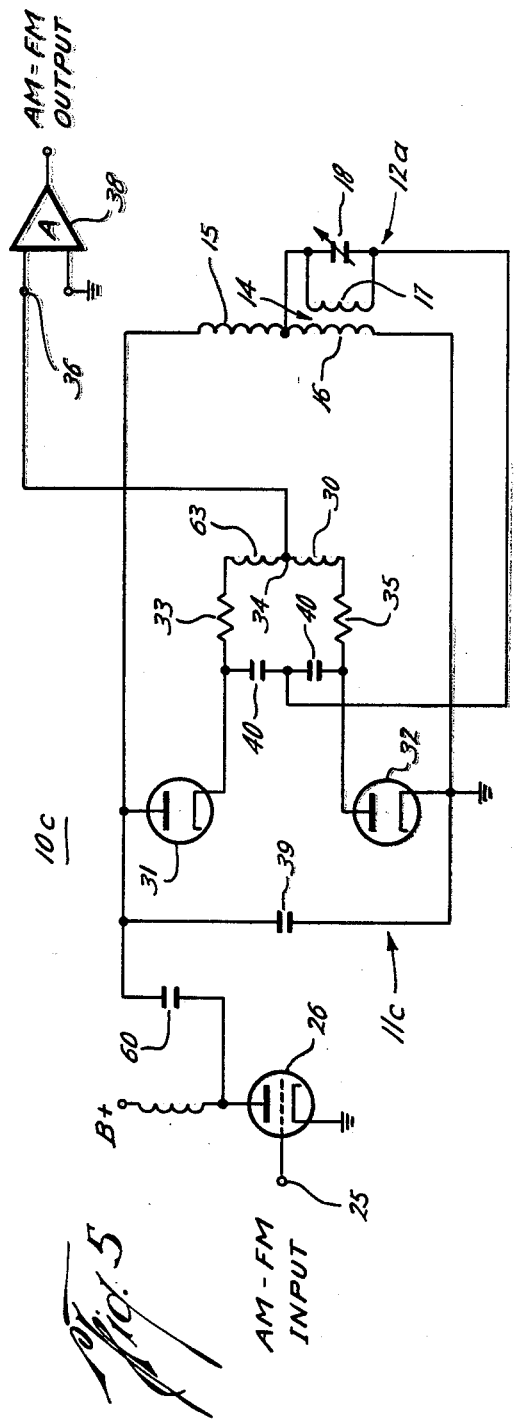
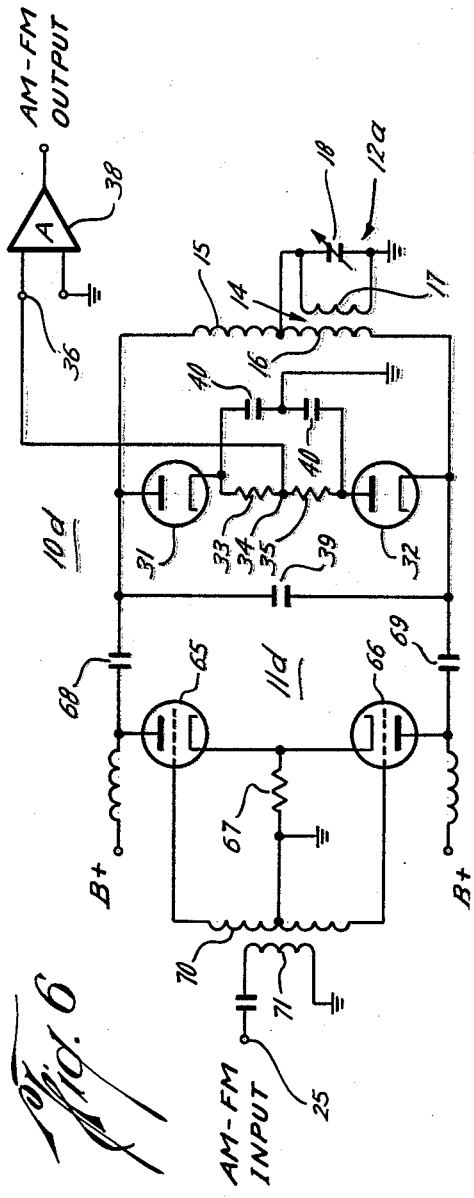
Gunnar Richwell
INVENTOR.
BY *William R. Sherman*
ATTORNEY United States Patent Office 3,137,821
Patented June 16, 1964

3,137,821
DISCRIMINATORS
Gunnar Richwell, New York, N.Y., assignor to Computer Systems, Inc., New York, N.Y., a corporation of New York
Filed Mar. 14, 1960, Ser. No. 14,662
15 Claims. (Cl. 329—135)

This invention relates to discriminators and, more particularly, to discriminators useful in analog computers, which are responsive to both frequency modulation and amplitude modulation of an input signal to provide an output which is a function of the two modulations.

In analog computers, the desirable performance characteristics usually include high accuracy and rapid response. These requirements are not readily met in the multiplication or division of values; thus, use has commonly been made of relatively slow speed, high accuracy servo multipliers. On the other hand, electronic discriminator circuits inherently offer possibilities of high speed response, so that a simultaneous achievement of high accuracy would largely fulfill the requirements for an optimum multiplier or divider.

An electronic analog multiplier has been proposed heretofore employing a pair of Foster-Seely discriminators. Discriminators of this type have a primary winding across which the input signal is impressed and a tuned secondary winding inductively coupled to the primary winding. By connecting the center tap of the secondary winding to one end of the primary winding, resultant voltages with respect to ground are developed at the ends of the secondary winding representing the vector sum and difference of the secondary voltage and one-half the primary voltage. These resultant voltages are rectified by diodes in the tuned secondary circuit and combined in one sense to obtain an output signal (AM-FM) varying as a function of both the amplitude modulation (AM) and the frequency modulation (FM) of the input signal. They are combined also in another sense to obtain an output signal (AM) varying as a function only of the amplitude modulation of the input signal. In order that the AM output signal may be used in a feedback loop effectively to linearize the multiplication obtained with a pair of discriminators, it is necessary not only that the discriminators be matched but also that they have an AM output which is in exact linear correspondence with the AM-FM output for an input signal of given frequency. The AM-FM output must therefore exhibit no spurious change in amplitude with changing amplitude of the input signal. This requires that the phase relations between the primary and secondary voltages, which determine the frequency discriminating action, be independent of input signal amplitude.

Unfortunately, this has proved exceedingly difficult to achieve, largely because the circuit elements which may reasonably be employed in the discriminator circuit, specifically the diode detectors, experience impedance changes with signal amplitude variations. In a conventional FM discriminator, such as a Foster-Seeley, the diode detector impedance changes result in a detuning of the secondary circuit and a corresponding distortion of the linear relation between the AM output and the AM-FM output derived from resultant voltages in the secondary circuit. In addition, diode impedances change with variations in ambient temperature, so that the utility of a conventional FM discriminator as a multiplying element is severely limited.

It is an object of the present invention to provide new and improved discriminators in which the foregoing disadvantages of conventional FM discriminators are overcome.

A further object of the invention is to provide new and improved discriminators having a secondary circuit which requires only those components necessary for tuning and temperature compensation, so as to be substantially free of detuning effects.

Yet another object of the present invention is to provide new and improved discriminators which develop an AM-FM output varying in exactly linear direct proportion to an AM output developed thereby, in response to input signals of any given frequency over a wide dynamic range.

These and other objects of the invention are achieved by arranging diode detectors in the primary circuit of a discriminator, rather than in the tuned secondary circuit. More particularly, the discriminator comprises primary and secondary circuits inductively coupled by the primary and secondary windings of a discriminator transformer, the secondary circuit and preferably also the primary circuit being tuned at a given frequency. The high potential side of the secondary winding is coupled to a tap of the primary winding. In the primary circuit are a pair of asymmetrically conductive diode detectors serially connected across the ends of the primary winding and having a junction point balanced with respect to the primary winding tap. An input signal, which may be amplitude modulated as well as frequency modulated, is applied to the primary winding to develop across one diode a voltage proportional to the sum of the secondary voltage and a portion of the total primary voltage and across the other diode, a voltage proportional to the difference between the secondary voltage and a portion of the primary voltage. A demodulated output (AM-FM) is then derived representing an arithmetic combination of the rectified voltages detected by the individual diodes. Such output voltage varies in direct relation to the frequency deviation of the input signal and, furthermore, varies in direct proportion to amplitude modulation of the input signal. An output signal (AM) varying in proportion to amplitude modulation only may also be derived by taking an arithmetic combination of such rectified voltages.

In modifications of the invention, the diode detectors are connected in oppositely-poled relation alternatively to a similarly-poled connection. In other modifications, the input signal is coupled to the discriminator without use of an isolation transformer. Another embodiment incorporates a push-pull driving arrangement.

The invention together with others of its objects and advantages will be better understood from the following detailed description taken in conjunction with the accompanying drawings, in which:

FIG. 1 is a schematic diagram of a discriminator incorporating principles of the invention;

FIGS. 2A and 2B are vector diagrams illustrating representative potential relationships for the discriminator in FIG. 1; and FIGS. 3, 4, 5 and 6 are schematic diagrams of modified discriminators incorporating the principles of the invention.

In FIG. 1 is shown a phase-shift discriminator 10 in accordance with the invention, which includes a primary circuit 11 and a secondary circuit 12. The secondary circuit 12 and preferably also the primary circuit 11 are resonant at substantially the same frequency $f_0$ with respect to which modulation or deviation of an input signal frequency is to be detected.

The primary and secondary circuits are inductively coupled by discriminator transformer 14 having first and second, like primary windings 15, 16 in the primary circuit 11, and a second winding 17 in secondary circuit 12. The secondary circuit 12 further consists of a tuning capacitance, which may be provided by an adjustable tuning capacitor 18 and a temperature compensating capacitor 19 connected in parallel across the ends of the secondary winding 17, and a non-linearity compensation circuit. The latter may comprise a trimmer capacitor 20 and diode 23 connected in series between tap 21 and ground, with a resistor 24 affording a suitable time constant bridged across diode 23.

To introduce potential $E_s$ induced in secondary winding 17 into the primary circuit 11, one end of secondary winding 17 is connected to a common center or mid-tap 21 of primary windings 15, 16 while the other end of secondary winding 17 is connected to a reference potential or ground point. Across the opposite ends of the primary windings 15, 16 is developed a total primary voltage corresponding with an input signal applied to the discriminator. Conveniently, such input signal may be applied at input terminal 25 to the control grid of an amplifier tube 26, the amplified output of which is applied to the primary winding 27 of input transformer 28. The secondary winding 29 of the input transformer has its ends connected directly to the opposite ends of the primary windings 15, 16. Both the secondary winding 29 of the input transformer 28 and the primary windings 15, 16 of the discriminator transformer 14 are shielded and thus isolated from ground to permit development of resultant potentials with respect to ground at the opposite ends of the primary windings. A second winding 30 may, if desired, be connected in parallel with winding 17 and suitably employed, for example, as an R.F. choke.

Since the input signal may typically comprise a radio frequency carrier modulated both in amplitude and frequency in the radio frequency range, the transformers may be of any design suitable for operation in this range. For example, the input signal may have a carrier frequency of 1.5 megacycles in which case the transformer design would be typical of intermediate frequency transformers.

To derive a demodulated output signal varying in direct relation both as to the amplitude modulation and the frequency modulation of the input signal, there are connected across the opposite ends of the primary windings 15, 16, a pair of asymmetrically conductive devices 31, 32, preferably thermionic emission diodes, the filaments of which are heated by a regulated voltage supply (not shown). Desirably the diodes are matched but satisfactory results may be obtained where the diodes are of the same type picked at random from available stock.

To provide a series connection of the diodes 31, 32 in similarly poled relation, resistor 33 connects the cathode of diode 31 to a common junction point 34, and resistor 35 connects the junction point to the anode of diode 32. A balanced relation between the diodes 31, 32 and the mid-tapped primaries 15, 16 may be achieved with resistors 33, 35 having identical value, for example, 200 kilohms. The junction point 34 is, in turn, suitably connected via output terminal 37 to the input of a responsive device such as D.C. operational amplifier 38. A demodulated output potential (AM-FM) varying in direct relation to both the amplitude and frequency modulation of the input potential is then derived at the output of amplifier 38 with respect to ground, which may conveniently be employed in a multiplier or in other applications.

Desirably, the primary circuit 11 is made resonant at the same frequency to which the secondary circuit 12 is tuned as by a capacitor 39 connected in parallel with the primary windings 15, 16. Parallel trimming capacitance adjustable with respect to a grounded mid-tap may also be provided to achieve balance at the tuned frequency. A pair of capacitors 40 are, for purposes of R.F. bypass, connected in parallel with resistors 33, 35, with their junction grounded.

To provide further compensation for variations in the diode characteristics and an identical R.F. load for either polarity, a pair of diodes 41, 42 are connected in similarly poled, series relation across the opposite ends of primary windings 15, 16, just as are diodes 31, 32, but with the opposite polarity. This series connection is completed by a pair of resistors 43, 44 having a common junction at ground and their other ends connected, respectively, to the anode of diode 41 and cathode of diode 42. Resistors 43, 44 may both have high valued resistances such as 160 kilohms and 200 kilohms, respectively, and have respective by-pass capacitors 45 connected in parallel with them.

For versatility in the application of the discriminator 10 to AF-FM multiplier systems, the discriminator may have a pair of resistors 46, 47 connected in series between the cathode of diode 42 and plate of diode 31, for example. To junction 48 of resistors 46, 47 is connected via output terminal 50 another D.C. operational amplifier 51. Resistors 46, 47 as well as a balancing resistor 52 may have a value of 1 megohm. At the output of amplifier 51, a demodulated output signal (AM only) may be derived corresponding to the amplitude modulation of the input signal and varying in exact linear relation with the AM-FM output signal in the absence of frequency modulation of the input signal.

In a typical operation of the discriminator of FIG. 1, a modulated input signal, such as a radio frequency carrier modulated in both amplitude and frequency, is applied to the input terminal 25, amplified by tube 26, and coupled via input transformer 28 to the primary windings 15, 16 of the discriminator transformer 14. Respective primary potentials $E_{p1}$ and $E_{p2}$ are thus developed in the primary windings 15, 16, which, with respect to the center tap 21, may be represented vectorially by the oppositely-directed vectors $E_{p1}$, $E_{p2}$ of FIGS. 2A and 2B.

The sum of the primary potentials $E_{p1}$, $E_{p2}$ is, of course, directly proportional to amplitude modulation of the input potential applied at terminal 25 with respect to ground. While summing rectified versions of these potentials would result in a rectified output potential varying only with amplitude modulation of the input carrier signal (AM-only), the desired AM-only output is conveniently derived by summing amplifier 51 in a manner described hereafter. The performance of the discriminator is such that a new AM-FM output signal is obtained by summing amplifier 38 which likewise varies in direct relation to amplitude modulation of the input signal; more particularly, for a given input frequency, the AM-only output and the AM-FM output vary in exactly linear relation with changing input amplitudes.

To achieve such exact linearity, the secondary circuit 12 of the discriminator consists simply of the secondary winding 17 and the reactive capacitance (which may include non-linearity compensation) which renders the circuit resonant at the desired frequency. Consequently, the circuit is not subject to detuning effects with input signal amplitude variations. Instead, the circuit accurately determines the relative phase relation $\phi$ between the potential $E_s$ induced in the secondary winding 17 and the potentials $E_{p1}$ and $E_{p2}$ in the primary windings, as indicated in the vector diagrams of FIGS. 2A and 2B. The resultant potentials $E_{r1}$ and $E_{r2}$ obtained by vector addition of the secondary potential $E_s$ with the primary potentials $E_{p1}$ and $E_{p2}$, respectively, are developed at the opposite ends of the primary windings 15, 16 and applied to the respective diodes 31, 32 with respect to ground. Because of the opposite polarity of the diodes, the output of the summing amplifier 38 represents the difference between the rectified resultant potentials $E_{r1}$ and $E_{r2}$, in other words, the arithmetic difference between the absolute magnitudes of these vector quantities. This difference signal is the desired AM-FM demodulated output potential.

To obtain an AM-only output potential, the resultant potentials $E_{r1}$ and $E_{r2}$ detected by diodes 31 and 42, respectively, are applied via resistors 46, 47 to summing amplifier 51. Its output is then the arithmetic sum of the rectified resultant potentials which represent the absolute magnitudes of $E_{r1}$ and $E_{r2}$. This provides the desired AM-only output.

In contrasting the present discriminator or demodulator with conventional phase-shift discriminators such as described in section 17–6 of "Electronic and Radio Engineering" (4th edition, 1955, McGraw-Hill Book Co., Inc.), by F. E. Terman, it will be noted that the connection of the diode detectors is unique in their placement in the primary circuit 11, rather than the secondary circuit 12. The principal consequence of this significant difference is that the secondary circuit 12 according to the present invention is free of circuit detuning which otherwise results with input signal amplitude variations, because of diode detector dynamic impedance changes. Diode impedances change with variations in ambient temperature, as well as with signal amplitude, moreover. In conventional discriminators, therefore, up to 5% distortion may be attributable directly to the resultant detuning effects in the secondary circuit.

With the diode detectors in the primary circuit, in accordance with the present invention, they will only detune the primary but to a vastly lesser degree and with a different effect. Since any phase shift occurring in the primary will also appear in the secondary and only the relative phase shift between the primary and secondary affects the magnitude of the resultant voltages $E_{r1}$ and $E_{r2}$, such shift will have no adverse effect. Rather, a small shift in the discriminator response curve may occur which ordinarily may be ignored. However, even the remaining non-linearity arising from this shift may readily be compensated.

Thus, according to the invention, the trimmer capacitor 20 charges up during positive R.F. peaks to bias diode 23 negatively. As is well known, a diode acts as a capacitor, when reverse biased, having a capacitance variable with the bias. To maintain the bias continuously in correspondance with a changing R.F. level, the resistor 24 provides a discharge path of suitably short time constant to follow reductions in level corresponding to the highest modulation frequencies employed. Thus, under control of capacitor 20, the secondary is subject to continuous slight retuning as will exactly cancel the above-mentioned remaining non-linearity. In commercial discriminators embodying the present invention, a resulting overall linearity of better than 1:10,000 has been achieved.

In the present discriminator, moreover, compensation for ambient temperature changes is provided by temperature compensating capacitor 19 in the secondary circuit 12 whereby accurate tuning of the secondary circuit is substantially unaffected by temperature changes.

Thus, whereas in the conventional discriminator, amplitude variations at the input terminals of the discriminator are treated as noise and are commonly avoided by the use of amplitude limiters, by the present invention highly accurate response to such amplitude variations is achieved, making possible linear multiplication of two variables represented, respectively, by the amplitude modulation and the frequency modulation of the input signal applied to the discriminator.

One manner in which such linear multiplication may be achieved is illustrated and described in "Electrical Design News" (Rogers Publishing Co., July 1959), vol. 4, No. 7, at pages 14, 15. In such instance, matched discriminators incorporating the principles of the invention are preferably employed. Since each of such discriminators is capable of an output up to ±100 volts, in an exemplary version, deviating from a straight line relationship with the input by less than 10 millivolts, a highly linear multiplication at characteristically high speed may be achieved. The discriminator of the present invention may also, of course, be employed in other analog systems wherein divisions, powers and roots of varying quantities are derived.

If desired, there may be substituted for either or both of the current outputs AM-FM and AM-only at terminals 37 and 50, a corresponding voltage output. For this purpose, a low-valued resistor may be connected between junction point 34 and ground for the AM-FM output potential to be developed thereacross. Similarly, a low-valued resistor connected between junction point 48 and ground will exhibit a potential across it which is the AM-only output.

Another arrangement for deriving the respective outputs is shown in FIG. 3. Here, the diode detectors 31, 32 are oppositely poled while detectors 41, 42 are similarly poled in the modified primary circuit 10a. A simplified secondary circuit 12a is shown coupled to tap 21 by blocking capacitor 53. Choke coil 30 here connects between the primary mid-tap 21 and junction point 34, and such point 34 is coupled via by-pass capacitor 54 to ground. A second D.C. path is provided by choke 30a, and isolated by blocking capacitor 55.

As illustrated, the modified discriminator 10a provides a current output (AM-FM) at terminal 37 proportional to the algebraic sum of the rectified potentials developed across resistors 33 and 35. Since the diode detectors 31, 32 are oppositely poled, such current output is actually proportional to the difference in the absolute value of resultant vectors $E_{r1}$ and $E_{r2}$ just as was the AM-FM output of the discriminator of FIG. 1. When switch 56 is closed, a voltage output (AM-FM) is developed across resistor 57, in lieu of the current output. Similarly, a voltage or a current output (AM-only) at terminal 50 may be derived, depending on whether or not resistor 58 is connected between terminal 50 and ground by closing switch 59. In other respects, the operation of the modified discriminator 10a corresponds with that of FIG. 1.

Another embodiment 10b of the invention is shown in FIG. 4 wherein the input or isolation transformer 28 is dispensed with. Instead, the AM-FM input to the primary circuit 11b is coupled via capacitor 60 to one end 15 of the primary winding 15, 16, and the other end 16 is R.F. grounded via capacitor 61. The formerly-grounded end of the tuned secondary 12a is here returned to the junction point 34 for the oppositely poled diode detectors 31, 32. As in FIG. 3, the AM-FM output is taken from the cathode of diode 31 but here via choke coil 63. Similarly, the D.C. ground is effected via choke coil 30 connected to the cathode of diode 32, rather than directly from the latter cathode to ground.

Operation of the embodiment of FIG. 4 will be evident from that described in conjunction with FIGS. 1 and 3.

Like the embodiment of FIG. 4, the discriminator 10c of FIG. 5 is free of an isolation transformer, but like FIG. 1, the diode detectors 31, 32 are similarly poled. Direct grounding of the end 16 of the primary winding and direct connection of junction point 34 to the operational amplifier 38 provide the desired AM-FM output. An R.F. circuit, on the other hand, is provided by returning the secondary winding 17 via by-pass capacitors 40 to the cathode and anode, respectively, of diodes 31, 32, the R.F. being blocked from the output by choke coils 30, 63 in series with resistors 33, 35. Operation of this embodiment will be understood from that given for FIG. 1.

In FIG. 6, provision is made for push-pull signal translation, in lieu of the single ended operation characterizing the embodiment of FIG. 5, for example. The primary circuit 11d of the modified discriminator 10d shown in FIG. 5 has a pair of triodes 65, 66 having a common cathode connection tied via resistor 67 to ground and their anodes coupled via blocking capacitors 68, 69 to the respective ends of primary windings 15, 16. To drive the triodes 65, 66 in a conventional push-pull arrangement, their control grids are connected to the end terminals of the input transformer secondary 70, the mid-tap of which is grounded. The primary winding 71 of the input transformer is then coupled between input terminal 25 and ground.

Apart from push-pull operation, the modification of FIG. 6 corresponds with that of FIG. 5. As in each of the previously described embodiments (FIGS. 1, 4 and 5), the secondary circuit contains the secondary winding and the tuning capacitor, while the diode detectors are in the primary circuit.

It will be evident, then, that by having the critical secondary circuit of the discriminator completely free of components other than those necessary for tuning and temperature compensation, an immense advantage in accuracy is derived. Such detuning as may be caused by diode impedance changes with variations in signal amplitude level affects the phase angle $\phi$ of both the primary and secondary voltages of the discriminator transformer equally; hence, all of the voltage vectors represented in the diagrams of FIGS. 2A and 2B rotate an equal amount in the same sense, without changing the amplitude of the output signal. By incorporating the temperature compensating capacitor 19 in the secondary circuit, the discriminator is substantially insensitive to temperature variations and thus free of drift. Furthermore, use of the input transformer has the effect of filtering out harmonics of the input signal which would otherwise, due to the well-known "turn-over" effect (typically characterized by a 180° shift in the third harmonic), cause a non-linearity in the output voltage.

Various modifications and additional embodiments of the invention herein described and illustrated, as well as further advantages, will be apparent to those skilled in this art. Accordingly, the invention is not to be limited to the embodiments illustrated and described but is of a scope defined in the appended claims.

What is claimed is:

1. A discriminator comprising primary and secondary circuits having respective primary and secondary windings disposed in inductively coupled relation, said primary circuit including a pair of detector devices connected with opposite ends of said primary windings, means for applying a modulated input signal to the opposite ends of said primary windings, said secondary winding being coupled to a tap point intermediate said primary windings to develop resultant potentials at the opposite ends of said primary windings, reactive means for tuning said secondary winding to a resonant frequency, and output means for deriving from said detector devices a detected version of said resultant potentials corresponding to the modulation of said input signal.

2. A discriminator comprising primary and secondary circuits having respective primary and secondary windings disposed in inductively coupled relation, said primary circuit including a pair of detector devices, impedance means for connecting said detector devices in series across opposite ends of said primary windings, means for applying a frequency modulated input signal to the opposite ends of said primary windings, said secondary winding being directly coupled to a tap point intermediate said primary windings to develop resultant potentials at the opposite ends of said primary windings, reactive means for tuning said secondary winding to a resonant frequency, and output means for deriving from said impedance means a detected version of said resultant potentials corresponding to the modulation of said input signal.

3. A discriminator comprising primary and secondary circuits having respective primary and secondary windings disposed in inductively coupled relation, said primary circuit including a pair of diode detectors connected to respective opposite ends of said primary windings, means for applying a modulated input signal to the opposite ends of said primary windings, one end of said secondary winding being coupled to a tap point intermediate said primary windings to develop resultant potentials at the opposite ends of said primary windings for detection by said diode detectors, reactive means for tuning said secondary winding to a resonant frequency, and means responsive to the detected resultant potentials for deriving an output signal which varies in amplitude in correspondence with the modulation of said input signal.

4. A discriminator comprising primary and secondary circuits having respective primary and secondary windings disposed in inductively coupled relation, said primary circuit including a pair of diodes connected to respective opposite ends of said primary windings, means for completing A.C. and D.C. paths serially through said diodes, means for applying a modulated input signal to the opposite ends of said primary windings, one end of said secondary winding being coupled to a tap point intermediate said primary windings to develop resultant potentials at the opposite ends of said primary windings which are detected by said diodes, reactive means in said secondary circuit for tuning said secondary winding to a resonant frequency, and means coupled with said D.C. path and responsive to said detected potentials for deriving a detected version of said resultant potentials corresponding to the modulation of said input signal.

5. A discriminator comprising primary and secondary circuits having respective primary and secondary windings disposed in inductively coupled relation each tuned to a common resonant frequency, only said primary circuit including a pair of diode detectors, said diode detectors being connected to respective opposite ends of said primary windings, a pair of resistors connected intermediate said diodes in a series D.C. path, means for applying a frequency modulated input signal to the opposite ends of said primary windings, capacitor means connected in by-pass across said resistors, one end of said secondary winding being directly connected to the mid-tap of said primary windings to develop resultant potentials at the opposite ends of said primary windings, and means coupled with said resistors for deriving a detected version of said resultant potentials corresponding to the modulation of said input signal.

6. A discriminator comprising primary and secondary circuits having respective primary and secondary windings disposed in inductively coupled relation, said primary circuit including a pair of detector devices connected with opposite ends of said primary windings, means including an isolation transformer for applying a modulated input signal to the opposite ends of said primary windings, one end of said secondary winding being coupled to a tap point intermediate said primary winding to develop resultant potentials at the opposite ends of said primary windings, reactive means for tuning said secondary winding to a resonant frequency, and output means for deriving from said detector devices a detected version of said resultant potentials corresponding to the modulation of said input signal.

7. A discriminator comprising primary and secondary circuits having respective primary and secondary windings disposed in inductively coupled relation, said primary circuit including a pair of diode detectors connected to respective opposite ends of said primary windings and at least one additional diode detector connected to one end of said primary windings in oppositely poled relation with respect to the correspondingly connected one of said pair of diodes, means for applying an amplitude and frequency modulated input signal to the opposite ends of said primary windings, one end of said secondary windings being coupled to a tap point intermediate said primary windings to develop resultant potentials at the opposite ends of said primary windings for detection by said diode detectors, reactive means for tuning said secondary winding to a resonant frequency, means responsive to the detected resultant potentials for deriving an output signal which varies in amplitude in correspondence with the amplitude and frequency modulation of said input signal, and means coupled with said additional diode detector for deriving an output signal varying in accordance with amplitude modulation only of said input signal.

8. A discriminator comprising primary and secondary circuits having respective primary and secondary windings disposed in inductively coupled relation, said primary circuit including a pair of detector devices connected with opposite ends of said primary windings, means including a pair of amplifying devices connected in push-pull relationship for applying a modulated input signal to the opposite ends of said primary windings, one end of said secondary winding being coupled to a tap point intermediate said primary windings to develop resultant potentials at the opposite ends of said primary windings, reactive means for tuning said secondary winding to a resonant frequency, and output means for deriving from said detector devices a detected version of said resultant potentials corresponding to the modulation of said input signal.

9. In an analog computer, the combination comprising a transformer having primary and secondary windings, diode detectors, one pair of which is connected across the primary windings of said transformer in similarly-poled series relation and another pair of which is connected thereacross in similarly poled series relation of opposite sense, means for applying an input signal modulated in frequency and amplitude to said primary windings, means completing a resonant secondary circuit with a secondary winding of said transformer tuned at a frequency with respect to which said input signal is frequency modulated, means coupling one end of said secondary winding with a tap point intermediate said primary windings, and means coupled with said diode detectors for deriving a first output signal representing the amplitude and frequency modulation of said input signal and a second output signal representing the amplitude modulation only of said input signal.

10. A discriminator comprising a primary circuit and a resonant secondary circuit tuned to a given frequency having respective primary and secondary windings disposed in inductively coupled relation, said primary circuit including a pair of diodes connected in similarly poled series relation across opposite ends of said primary windings so as to be balanced relative to the series junction point for said diodes and to the mid-tap of said primary windings, means for applying a modulated input signal to the opposite ends of said primary windings, said secondary winding being coupled to the mid-tap of said primary windings to develop resultant potentials at the opposite ends of said primary windings, and means responsive to the arithmetic sum of the rectified currents flowing through said diodes for deriving an output signal which varies linearly with modulation of said input signal.

11. A discriminator comprising resonant primary and secondary circuits tuned to substantially the same frequency, said primary circuit including a pair of primary windings joined at a center tap and a pair of asymetrically conductive devices connected in series relation across opposite ends of said primary windings, said primary circuit being balanced relative to the center tap of said primary windings and to the junction point of said diodes, means for applying a modulated input signal across the opposite ends of said primary windings, said secondary circuit including a secondary winding having one end connected to the center tap of said primary windings and the other end connected to a potential reference point, and means connecting the junction point of said devices with said potential reference point for passing the sum of the rectified currents flowing through said devices, whereby a demodulated output signal may be derived in response to said current sum.

12. A discriminator comprising primary and secondary circuits having respective primary and secondary windings disposed in inductively coupled relation, said primary circuit including a pair of diodes connected in similarly poled series relation across opposite ends of said primary windings so as to be balanced relative to both the series junction point for said diodes and the mid-tap of said primary windings, means for applying a frequency modulated input signal to the opposite ends of said primary windings, said secondary winding being coupled to the mid-tap of said primary windings to develop resultant potentials at the opposite ends of said primary windings, reactive means for tuning said secondary winding to a resonant frequency, and means coupled with said diodes for deriving an output signal which varies with modulation of said input signal.

13. In an analog computer, the combination comprising a transformer having primary and secondary windings, a pair of diodes connected across the primary windings of said transformer in similarly-poled series relation balanced with respect to a center tap of said primary windings, means for applying an input signal modulated in frequency and amplitude to said primary windings, means completing a resonant secondary circuit with a secondary winding of said transformer tuned at the frequency with respect to which the input signal is frequency modulated, means coupling one end of said secondary winding with the center tap of said primary windings, and means coupled with said diodes for deriving output signals representing the arithmetic difference in the rectified voltages derived from said diodes with respect to the other end of said secondary winding.

14. In an analog computer, the combination comprising a discriminator transformer having primary and secondary windings, a pair of diodes connected across the primary windings of said discriminator transformer in similarly-poled series relation balanced with respect to a center tap of said primary windings, means for applying an input signal modulated in frequency and amplitude to said primary windings including an input transformer having its secondary winding connected across said primary windings so as to isolate the same from ground, capacitance means in said primary and secondary circuits for tuning each to substantially the same frequency with respect to which said input signal is frequency modulated, means coupling the center tap of said primary windings to one end of the secondary winding of said discriminator transformer, and means coupled with said diodes for deriving an output signal representing the arithmetic difference in the rectified voltages derived from said diodes with respect to the other end of the secondary winding of said discriminator transformer.

15. In an analog computer, the combination comprising resonant primary and secondary circuits tuned to substantially the same frequency, said primary circuit including a pair of primary windings series connected at a center tap, a first pair of diodes having opposite poles connected to the opposite ends of said primary windings, a first pair of resistors connecting the remaining poles of said first pair of diodes to a junction point whereby said first pair of diodes are connected in similarly poled series relation with said primary windings, a second pair of diodes having poles opposite from those of said first pair of diodes connected to the respective opposite ends of said primary windings, a second pair of resistors connecting the remaining poles of said second pair of diodes to a junction point whereby said second pair of diodes are connected in similarly poled series relation with said primary windings, a third pair of resistors connecting a like pole of one diode in each pair of said diodes to a junction point, and an isolation transformer having its secondary connected to the opposite ends of said primary windings and its primary supplied with an input signal modulated in frequency and amplitude, said secondary circuit including a secondary winding inductively coupled with said primary windings and having one end directly connected with their center tap to develop resultant potentials at the opposite ends of said primary windings, tuning capacitance connected in parallel with said secondary winding, and a linearizing circuit connected in parallel with said tuning capacitance including a capacitor and a back-biased diode in series and a bleed-off resistor in parallel with said back-biased diode, the other end of said secondary winding being connected to a potential reference point, and means coupled with said first and third pairs of resistors for deriving a first output signal representing the arithmetic difference in the rectified versions of said resultant potentials and a second output signal representing the arithmetic sum of the rectified versions of said resultant potentials, respectively.

References Cited in the file of this patent

UNITED STATES PATENTS

| | | |
|---|---|---|
| 2,376,126 | Crosby | May 15, 1945 |
| 2,541,066 | Jaynes | Feb. 13, 1951 |
| 2,634,367 | Joseph | Apr. 7, 1953 |
| 2,927,321 | Harris | Mar. 1, 1960 |